(12) United States Patent
Sheshadri et al.

(10) Patent No.: US 10,700,931 B2
(45) Date of Patent: Jun. 30, 2020

(54) NETWORK DEVICE CONFIGURATION FRAMEWORK

(71) Applicant: MICROSOFT TECHNOLOGY LICENSING, LLC, Redmond, WA (US)

(72) Inventors: Sandeep Koushik Sheshadri, Kirkland, WA (US); Parveen Kumar Patel, Redmond, WA (US); Varun Venkatesh, Cupertino, CA (US); Nisheeth Srivastava, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 531 days.

(21) Appl. No.: 14/680,751

(22) Filed: Apr. 7, 2015

(65) Prior Publication Data

US 2016/0050116 A1 Feb. 18, 2016

Related U.S. Application Data

(60) Provisional application No. 62/038,330, filed on Aug. 17, 2014.

(51) Int. Cl.
*H04L 12/24* (2006.01)
*H04L 29/08* (2006.01)

(52) U.S. Cl.
CPC ...... *H04L 41/0843* (2013.01); *H04L 41/0813* (2013.01); *H04L 41/0853* (2013.01);
(Continued)

(58) Field of Classification Search
CPC .................................................. G06F 8/71
See application file for complete search history.

(56) References Cited

U.S. PATENT DOCUMENTS 6,336,138 B1 1/2002 Caswell et al.
2004/0117820 A1* 6/2004 Thiemann .......... H04N 7/17318
725/37
(Continued)

FOREIGN PATENT DOCUMENTS

CN 1617515 A 5/2005
CN 1806414 A 7/2006

OTHER PUBLICATIONS

"Second Written Opinion Issued in PCT Application No. PCT/US2015/044942", dated Jun. 23, 2016, 8 Pages.
(Continued)

*Primary Examiner* — Barbara B Anyan
(74) *Attorney, Agent, or Firm* — Shook, Hardy & Bacon, LLP (57) ABSTRACT

Various embodiments of methods and systems for network infrastructure configuration based on network device configuration templates are provided. A network device configuration template is received where the network device configuration template corresponds to network device configuration data based on template elements. Template elements include variable placeholders, versions, Stock Keeping Units (SKUs), firmware, and target devices identified in the network device configuration template. Values for the template elements are referenced from a dataset storage component. The network device configuration data are classified into different classification units. The network device configuration data are merged with the network device configuration template that programmatically defines configuration of network devices. A network device configuration instance is generated based on evaluating the template elements and replacing template elements with values from the dataset storage. The network device can be associated with a configuration scope, where the configuration scope
(Continued)

indicates intended configuration features of the network devices.

20 Claims, 5 Drawing Sheets

(52) U.S. Cl.
CPC .......... *H04L 41/0886* (2013.01); *H04L 67/10* (2013.01); *H04L 67/125* (2013.01); *H04L 41/12* (2013.01); *Y02D 30/30* (2018.01)

(56) References Cited

U.S. PATENT DOCUMENTS

| | | | | |
|---|---|---|---|---|
| 2006/0037000 A1* | 2/2006 | Speeter | ................. | H04L 67/125 717/120 |
| 2011/0069201 A1* | 3/2011 | Kawanishi | ............. | G03B 7/091 348/231.4 |
| 2013/0184885 A1* | 7/2013 | Keil | ........................ | F24F 11/61 700/291 |
| 2013/0346619 A1 | 12/2013 | Panuganty et al. | | |
| 2014/0280796 A1* | 9/2014 | Pijewski | ............. | H04L 41/0886 709/220 |

OTHER PUBLICATIONS

"International Preliminary Report on Patentability Issued in PCT Application No. PCT/US2015/044942", dated Nov. 14, 2016, 9 Pages.
International Search Report with Written Opinion dated Nov. 17, 2015 in Application No. PCT/US2015/044942, 13 pages.
"First Office Action and Search Report Issued in Chinese Patent Application No. 201580044090.7", dated May 29, 2019, 37 Pages.
"Office Action Issued in European Patent Application No. 15760537.9", dated Jun. 7, 2019, 6 Pages.
"Second Office Action Issued in Chinese Patent Application No. 201580044090.7", dated Nov. 7, 2019, 7 Pages.
"Office Action Issued in European Patent Application No. 15760537.9", dated Jul. 26, 2018, 5 Pages.
"Office Action Issued in Chinese Patent Application No. 201580044090.7", dated Mar. 19, 2020, 25 Pages.

* cited by examiner

NETWORK DEVICE CONFIGURATION FRAMEWORK

CROSS-REFERENCE TO RELATED APPLICATIONS

This application claims priority to U.S. Provisional Application Ser. No. 62/038,330, filed Aug. 17, 2014, entitled "NETWORK DEVICE CONFIGURATION FRAMEWORK," which is incorporated herein by reference in its entirety.

BACKGROUND

Computer networks or data networks refer to telecommunications networks that support exchange of data between computing devices. In particular, network devices including network hardware and network equipment mediate data between computing devices to support computer networks. Network devices facilitate networking using network device configuration data that include functional attributes that indicate how the network device operates. Network devices in computer networks help support different types of computing infrastructure, including distributed cloud computing systems, which provide platforms that may offer building, deployment and management functionality for different types of applications and services. Misconfiguration of network devices may cause outages that affect networked computing infrastructures. As such, the reliability of network devices and specifically network device configuration is vital in supporting computing infrastructures and in particular, the applications and services supported by a cloud computing system.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for datacenter network device configuration based on network device configuration templates. A network device configuration template is received where the network device configuration template corresponds to network device configuration data based on template elements. Template elements include variable placeholders, versions, Stock Keeping Units (SKUs), and firmware identified in the network device configuration template. Values for the template elements are referenced from a dataset storage component. The network device configuration data are classified into different classification units based on deriving, transforming, or interpreting the data using attributes of the network device configuration data. The network device configuration data are merged with the network device configuration template that programmatically defines configuration of network devices. A network device configuration instance is generated based on evaluating the template elements and replacing template elements with values from the dataset storage. In embodiments, a network device can be associated with a configuration scope, where the configuration scope indicates intended configuration features of the network device.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments of the present invention are described with reference to a cloud computing platform, infrastructure, or system (used herein interchangeably) and networking devices or network components therein. However, network device configurations and network device configuration templates in a cloud computing platform are merely exemplary and it is contemplated that the techniques described may be extended to other implementation contexts.

Computer networks or data networks refer to telecommunications networks that support exchange of data between computing devices. In particular, network devices including network hardware and network equipment mediate data between computing devices to support computer networks. Network devices facilitate networking using network device configuration data that include functional attributes that indicate how the network device operates. Network devices in computer networks help support different types of computing infrastructures, including distributed cloud computing systems, which provide platforms that may offer building, deployment and management functionality for different types of applications and services.

A cloud computing platform may span wide geographic locations, including countries and continents. The service-application components (e.g., tenant infrastructure or tenancy) of the cloud computing platform may include nodes (e.g., computing devices, processing units, or blades in a server rack) that are allocated to run one or more portions of a tenant's services and applications. When more than one application is being supported by the nodes, the nodes may be partitioned into virtual machines or physical machines. The virtual machines or physical machines run each application concurrently in individualized computing environments. The computing environments support the resources and/or operating systems specific to each application. Further, each application may be divided into functional portions such that each functional portion is able to run on a separate virtual machine or physical machine.

The functionality of cloud computing platforms depends on proper configuration of network devices to provide functionality for exchanging data between components in the cloud computing platform. Misconfiguration of network devices in a cloud computing platform or any other computing infrastructure can cause outages that affect the networked computing infrastructure. In this regard, the reliability of network devices and specifically network device configuration is vital in supporting computing infrastructures and in particular, the applications and services supported by a cloud computing system. Currently, conventional network device configuration frameworks are not effective in supporting reliable network device configurations.

Traditional network configuration frameworks have met some challenges in network configuration. Some challenges may be associated with the complexity of generating network device configurations for a variety of different network devices. For example, network device configurations depend on several different factors of a networked computing environment, such as, the network topology, services running on the network, and the operating configuration or environment. Network infrastructure data, specifically network device configuration data may also frequently change, for example, an access control list (ACL) that defines selective access and operations that may be performed by or at a network device, may be updated based on requests to the network infrastructure. During network device configuration such network device configuration data may not be known. With the number of factors to consider, a manual configuration methodology involving human effort may be adopted in configuring network devices, as such, lacking the benefits of dynamic and automatic network device configuration that includes limited or no human intervention.

Embodiments of the present invention provide a simple and efficient method of dynamic network device configuration based on network device configuration templates. A network device configuration framework is supported by several components used to execute two different workflows: a network device configuration data classification workflow that classifies dynamic network device configuration data into classification units and a network device configuration instance generation workflow that generates network device configuration based on the dynamic values of classified network device configuration data and the network device configuration templates.

Figure 1:
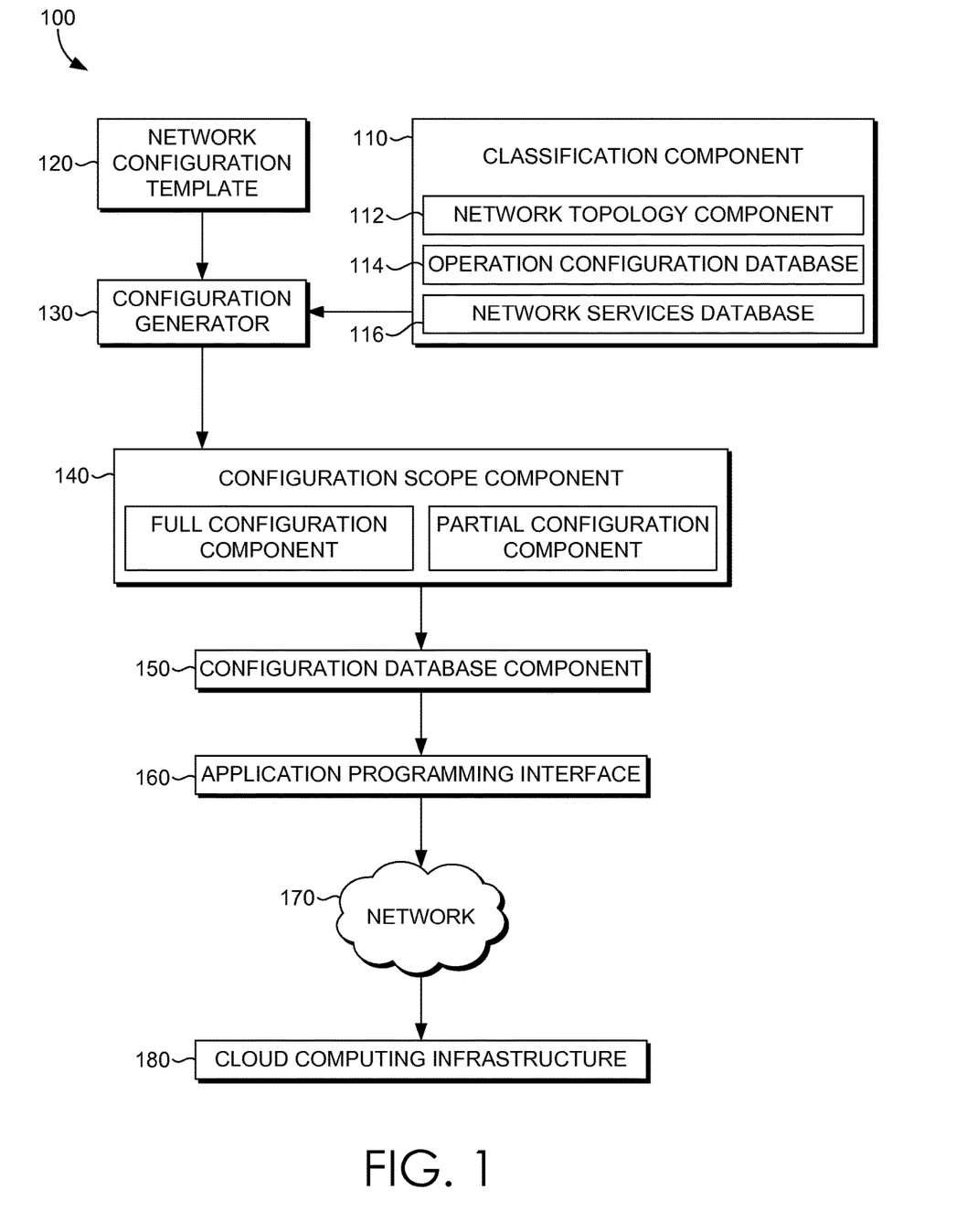
FIG. 1 is a network device configuration system for dynamic network device configuration, in accordance with embodiments described herein.

Turning now to FIG. 1, a block diagram depicting a network device configuration system 100 ("configuration system") in an operating environment suitable for use in implementing embodiments described herein is provided. Generally, the configuration system 100 may be used for, among other things, configuration network device based on network device configuration templates. Network device configuration data can be classified into classification units such that dynamic values of the network device configuration can be retrieved to configure corresponding network devices. In particular, a network device configuration instance can be generated based on the dynamic values and network device configuration templates. In embodiments, the network device configuration instance can be associated with a network device configuration scope, where the network device configuration scope (e.g., full configuration or partial configuration) indicates an intended configuration extent of a network device.

Among other components not shown, the configuration system 100 may generally include a classification component 110 having a network topology component 112, an operation configuration database 114, and network services database 116, device configuration template component 120, a configuration generator 130, a configuration scope component 140 having a full configuration component 142 and a partial configuration component 144, a configuration database component 150, and an application programming interface—API 160.

In some embodiments, one or more of the illustrated components and/or modules may be implemented as stand-alone applications. In further embodiments, one or more of the illustrated components and/or modules may be implemented via a computing device, as an Internet-based service, and/or as a module within a client component and the cloud computing platform. It will be understood by those of ordinary skill in the art that the components and modules illustrated in FIG. 1 are exemplary in nature and in number and should not be construed as limiting.

Any number of components and/or modules may be employed to achieve the functionality described herein. For example, any number of client components, cloud computing platforms and components thereof and networks may be employed in the configuration system 100 within the scope of embodiments hereof. Each may comprise a single device/interface or multiple devices/interfaces cooperating in the configuration system 100. For instance, multiple devices and/or modules arranged in a distributed environment may collectively provide the configuration system functionality described herein. The phrase "application" or "service" as used herein may broadly refer to any software, or portions of software, that run on top of, or access storage locations within, a computing device and/or multiple computing devices, such as multiple computing devices in a data center.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein, as being performed by one or more entities, may be carried out by hardware, firmware, and/or software. For instance, various functions, including the functions described below with respect to the neural network system 800, may be carried out by a processor executing instructions stored in memory.

Turning now to the various workflows supported via the configuration system 100. The classification component 110 can be responsible for performing functionality corresponding to the network device configuration data classification workflow. In operation, the network device configuration data classification workflow ("classification workflow") includes identifying, classifying, recording a plurality of network device configuration data associated with the network infrastructure. Network device configuration data may refer to a network device and/or the value of the network device associated therewith. For example, network device configuration data can identify a component, such as, a switch and the value associated with the component as a CISCO NEXUS 3064. Network device configuration data can be specifically dynamic, in that, the stored, processed, or programmed data of the network infrastructure may be altered over time. As such, network device configuration data may be classified during the network device configuration data classification workflow. Network classification comprises classifying network device configuration data into classification units based on deriving, transforming, retrieving, or interpreting the data to assign to a selected classification unit.

The configuration generator component 130 can be responsible for supporting functionality corresponding to the network device configuration instance workflow. The network device configuration instance generation workflow ("generation workflow") generates network device configuration based on the dynamic values of classified network device configuration data and network device configuration templates from the network device configuration template component 120. The classified network device configuration data may be retrieved from a network device configuration data dataset storage ("dataset storage) (not shown) that includes at least dynamic values of classified network device configuration data. The network device configuration templates ("configuration template") may be automatically or manually provided from the network device configuration template component 120 during the generation workflow.

The network device configuration template component 120 provides the configuration templates that programmatically define the configuration of a network device using template elements. The template elements are part of a template language with a common semantic to programmatically configure different types of network devices. One or more template elements are identified in the network device configuration template. The template elements in configuration templates can be populated (e.g., using a reflection mechanism via the configuration generator 130) to facilitate generating a network device configuration instance ("configuration instance"). In embodiments, generating the configuration instance may be based on a configuration generation service application via the configuration generator 130 that supports the generation workflow. The configuration generation service application periodically or based on changes in the infrastructure data triggers generating a configuration instance for one or more network devices.

Figure 2:
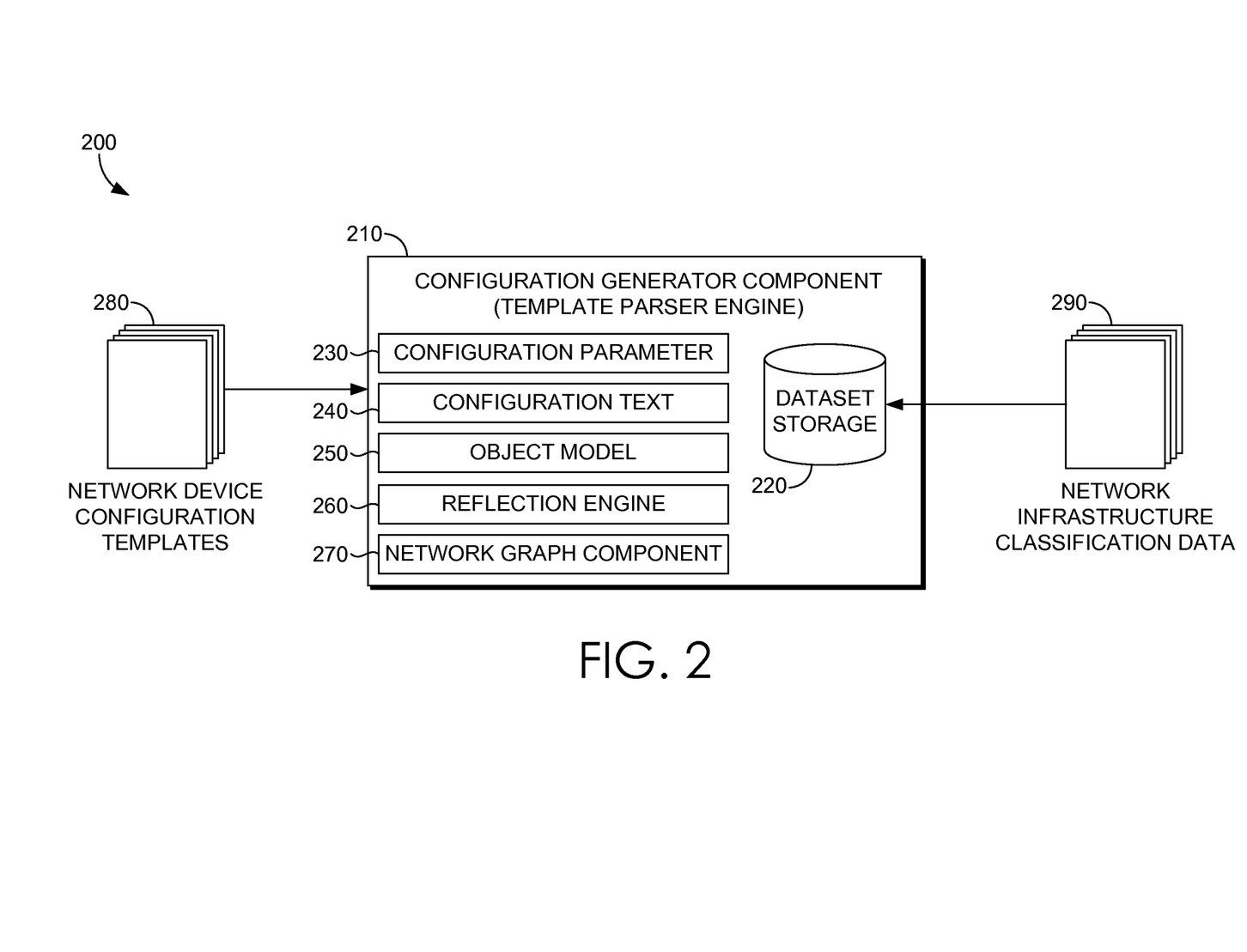
FIG. 2 is a configuration generator component for dynamic network device configuration, in accordance with embodiments described herein.

Generating the network device configuration instance may include accessing the dataset storage. With reference to FIG. 2, a schematic of a configuration generation system 200 is illustrated. The configuration generator 210 can include additional components that support generating the network device configuration instances. The configuration generator 210 functions as a template parser engine and the configuration generator system 200 further includes: dataset storage 220, configuration parameters 230, configuration text 240, object model 250, reflection engine 260, and network graph component 270. The dataset storage 220 may specifically include dynamic values of network device configuration data that may be accessed or automatically provided upon an update to facilitate generating the network device configuration instance. For example, a cloud computing platform comprises multiple virtual local area networks (VLAN). A VLAN refers to a partition in a network that creates a distinct broadcast domain which is isolated such that packets pass into the VLAN via one or more specific routers. Without a VLAN, a switch considers all interfaces on the switch to be in the same broadcast domain. In this regard, a switch can be configured to allocate traffic to different VLANs. The configuration information when entered may have to be associated with one or more network devices. New network device configuration data that is received via the dataset storage 220 can be dynamically pushed or retrieved from the dataset storage to configure one or more network devices that need the configuration updates. By way of example, the switch can be associated with a normal range for a VLAN and then altered to be configured with an extended range. Similarly, a firmware update of one or more network infrastructure devices may be reflected in the dataset storage and also trigger an update in the configuration of the network device receiving the firmware update.

The network device configuration template may include several template elements that are used to query the dataset storage 220. The template elements can be utilized to automatically and programmatically update the network device configuration using individual network device configuration instances. The network device configuration instances can be stored in the configuration database component 150 and transmitted based on the Application Programming Interface 160 to configure the network devices. The API 160 is responsible for communicating the network device configuration instances based on the target network device such that the network device configuration data of the template in executed on the network device for configuration.

With continued reference to FIG. 1, the network device configuration template component 120 includes support a single common semantic. The single common semantic embodied in the templates can be used to configure a plurality of network devices having different configuration mechanisms. In other words, the templates are programmed using the same template language in order to configure several different network devices that would otherwise have to be configured individually using a mechanism for configuration the particular network device.

In embodiments, a configuration template may be associated with a configuration scope which refers to whether a template provides a full configuration or partial configuration. The configuration scope component 140 is responsible for managing a full configuration scope component 142 and a partial configuration component 144. The configuration scope indicates the extent of configuration of a network device that depends on a desired goal state configuration to be generated for the network device. A configuration scope can indicate a full configuration scope when a configuration template includes plurality template elements that completely change the state of the configuration of a network device corresponding to the configuration template. And, a configuration scope can indicate a partial configuration scope when a configuration template includes one or more template elements that change a portion of the configuration of a network device corresponding to the configuration template. By way of example, a CISCO router can include several configurable features (e.g., wireless, security, access applications, and administration). The configuration template can be configured to perform a full configuration to update template elements associated with all the configuration features, and the configuration template can also be configured to update template elements associated with a selected configuration features (e.g., wireless).

Embodiments of the present invention can further be described with reference to implementation details of the classification workflow and the generation workflow. By way of background, network infrastructure generally refers to computer networks or data networks that support exchange of data between computing devices. In particular, network devices including network hardware and network equipment mediate data between computing devices to support computer networks. Network device configuration data may include the different components in the network, the functionality the network devices provide, and interfaces between components to provide functionality. As such, the network device configuration data may specifically be classified as one of three different network categories: network topology, operation configuration database, and network services database.

The network topology component 112 is responsible for managing the network topology data. The network topology may refer to the arrangements of various components (e.g., links, nodes, etc.) of a computer network, including a physical topology—placement of various components of a network including device location and cable installation, and logical topology—how data flows within the network regardless of its physical design. Network topology may further include distances between nodes, physical connections, transmission rates, or signal types that may differ between networks.

The operation configuration database 114 is responsible for managing operation configuration data. The operation configuration data or operation environment data can refer to the logical Internet Protocol (IP) resources in the network. Local area networks, VLANs, port ranges accessible and/or associated with network devices. Classification units can efficiently model the network infrastructure to support populating the configuration template with dynamic values of the classified network configuration data.

The network service database 116 is responsible for managing network services data. The network services can refer to functionality of the network device in the computing network. Network services can include functionality provided by a router, switch, or gateway and the interfaces between components. Network services can, for example, include controls, operations, and access of a network component and policies applied to support network services.

In addition, classification units (e.g., network topology, network services, and operating configuration) can specifically indicate retrieved data based on deriving, transforming, or interpreting the data. Network device configuration data may have a variety of different attributes that determine how the network device configuration data is classified and also retrieved. For example, network device configuration data may be predominantly static or predominantly dynamic. The location of the datacenter can be a predominantly static value while the number of virtual local area networks (VLAN) may be predominantly dynamic. In addition, certain network device configuration data may be not be directly accessible but rather have to be inferred or deduced from one or more additional components. Also, the formatting of network data from a particular network device may not be in a format that is directly recordable into a network device configuration dataset, as such, the data may be transformed into a format that is recordable in a dataset storage component, such that, it may support functionality in embodiments of the present invention. As such, attributes of the network device configuration data implicate the classification of network device configuration data and further includes the retrieval processing mechanisms for the network device configuration data.

The retrieval of network topology data can be different for network services or operation configuration data. Particular attributes and classifications may indicate that the data is to be derived, transformed, or interpreted in a particular way when retrieved under a particular classification. Other types of retrieval mechanisms are contemplated with embodiments of the present invention. In this regard, the network infrastructure can be intelligently identified, classified, and recorded as associated with the network infrastructure to provide during network device configuration.

With reference to the generation workflow, generating the network device configuration can be based of dynamic values of the network device configuration data, as described above, and a network device configuration template ("configuration template"). A configuration template may represent predefined network devices and network device configuration data in a customized format and structure. Network device configuration data comprises functional attributes that indicate how a network device operates, for example, the particular settings of the network device that facilitate the purpose of the different features of the network device. The configuration generator 210 can support configuration parameter 230, configuration text 240, and an object mode 250, that are used to programmatically define the functional attributes of network device configuration data 290 in the network device configuration templates 280 into a network device configuration instance. Specifically, the network device configuration template 280 comprises template elements that define individual network infrastructure components (e.g., network components including network devices, network device components, and network device component features) in the form of a network object model. The network object model is associated with a template language for representing and dynamically changing the network infrastructure components in the template; and in combination to the configuration parameters and configuration text can be used in generating different types of network device configuration instances.

The template language may comprise language commands associated with the object model that indicate actions to be performed on the network devices. In one embodiment, the language commands are embedded in XML format. In this regard, the template language is useful in authoring network device configuration templates for network devices in a language that easily and flexibly represents the network infrastructure components and the configuration states of the network infrastructure components.

The template language may specifically support different template elements that comprise variable placeholders, versions, SKUs, firmware, and target device roles. One or more of the template elements can be used to generate a configuration instance of the network device. The network device configuration template in one embodiment may be a simple configuration text file for network infrastructure components to be configured. Template elements may be predefined in the template and additional template elements may be dynamically populated from the network device configuration data stores. It is further contemplated that template elements that are predefined in the template can be overridden by more up to date values in the dataset storage 260. In one embodiment, dynamically changing the values of template elements is based on a reflection mechanism via the reflection engine 260 that uses type introspection, as discussed in more detail below. As such, the dynamic nature of networks can easily, consistent, and dynamically be represented in the network device configuration. Template elements in the network template may be associated with different features in the template language that facilitate evaluating the template elements to support generating a network device configuration instance.

An exemplary variable placeholder in syntax may be $NetworkHardware.Name. When the configuration generator via the reflection engine 260 encounters a variable, it may evaluate the variable and replace the variable with the appropriate value. The reflection engine 260 can use a reflection mechanism (e.g., .NET.) The reflection engine 260 may enable obtaining information about loaded assemblies and the types defined within them, such as classes, interfaces, and value types. The reflection engine 260 inspects each of the members for a given class and walks all the way to the specified member in that class. Depending upon whether a member is a method or a property, the reflection engine 260 appropriately invokes the method or gets the value of the property. In the above example, the Name property in the NetworkHardware class is replaced with its value for the target device. In other words, when the template system encounters a dot, it tries to do property or a method call.

The dataset storage that is used to populate these variables comes from a well-defined set of databases (e.g., classification component). A network-based object model may be populated from these data sources. Later this object model is used to instantiate device configuration from a given device template. Each instance of this object model will have the data populated for the given target device. Hence, each instance of the configuration generated can be different depending upon the object instance passed to the configuration generation engine.

A sample template is specified below:

```
<?xml version="1.0" encoding="utf-8"?>
<NetworkDeviceTemplate Version="2.0" TargetDeviceRole="Hostleaf">
    <TargetDevices>
        <Device>
            <Sku>CiscoNexus3064</Sku>
            <FirmwareVersion>1.0</FirmwareVersion>
        </Device>
        <Device>
            <Sku>CiscoNexus7000</Sku>
            <FirmwareVersion>1.0</FirmwareVersion>
        </Device>
    </TargetDevices>
    <ConfigSections>
        <ConfigSection>
        !
        version 5.0(3)U2(2)
        !
        no feature telnet
        no telnet server enable
        feature ssh
        feature tacacs+
        feature bgp
        feature interface-vlan
        feature lacp
        feature dhcp
        feature lldp
        !
        ! Role definitions
        !
        role name default-role
        description This is a system defined role and applies to all users.
        rule 5 permit command show feature environment
        rule 4 permit command show feature hardware
        rule 3 permit command show feature module
        rule 2 permit command show feature sump
        rule 1 permit command show feature system
        role name tier1-ro
        description Tier1 RO accounts
        rule 6 permit command copy running-config *
        rule 5 permit command telnet *
        rule 4 permit command ssh *
        rule 3 permit command traceroute *
        rule 2 permit command ping *
        rule 1 permit read
        role name tier1-rw
        description Tier1 RW Accounts
        rule 7 permit command copy running-config *
        rule 6 permit command clear *
        rule 5 permit command telnet *
        rule 4 permit command ssh *
        rule 3 permit command traceroute *
        rule 2 permit command ping *
        rule 1 permit read
        role name tools
        description Tools Accounts
        rule 2 permit command copy running-config *
        rule 1 permit read
        role name no-access
        description No Access Accounts
        rule 1 deny command *
        </ConfigSection>
        <ConfigSection RequiresReboot="true">
        !
        no ip domain-lookup
        ip domain-name ntwk.msn.net use-vrf management
        !
        tacacs-server key 0 $UnencryptedTacacsKey
        ip tacacs source-interface mgmt0
        tacacs-server host $FirstTacacsHost
        tacacs-server host $SecondTacacsHost
        tacacs-server host $ThirdTacacsHost
        !
        aaa group server tacacs+ tacacs
            server $FirstTacacsHost
            server $SecondTacacsHost
            server $ThirdTacacsHost
            use-vrf management
        !
        hostname $Hostname
        !
        no logging event link-status default
        no logging event trunk-status default
        !
        errdisable recovery interval 600
        errdisable recovery cause link-flap
        </ConfigSection>
        <ConfigSection ForEachVariable="$SnmpServer">
        !
        sump-server host $SnmpServer.IPAddress traps version 2c msft
        sump-server host $SnmpServer.IPAddress use-vrf management
        !
        </ConfigSection>
        <ConfigSection ForEachVariable="$AzureClusterVlan">
            interface Vlan$AzureClusterVlan.Tag
                description $StandardDescription
                no ip redirects
                ip address $AzureClusterVlan.IPAddressCidrNotation
                no sump trap link-status
                no shutdown
                ip directed-broadcast
                ip dhcp relay address $DHCPServer.IPAddress
        </ConfigSection>
    </ConfigSections>
    <UpdateConfigurations>
        <UpdateConfiguration SourceTemplateVersion="1.0">
            <ConfigSections>
                <ConfigSection ForEachVariable="$AzureClusterVlan">
                    ip directed-broadcast
                </ConfigSection>
            </ConfigSections>
        </UpdateConfiguration>
        <UpdateConfiguration SourceTemplateVersion="2.0">
            <ConfigSections>
                <ConfigSection ForEachVariable="$AzureClusterVlan">
                    no interface Vlan$AzureClusterVlan.Tag
```

```
        </ConfigSection>
      </ConfigSections>
    </UpdateConfiguration>
  </UpdateConfigurations>
</NetworkDeviceTemplate>
```

Sample of Partial Configuration Template:

The template below shows an example of partial configuration. The configuration can be used for updating the ACL (access control list) which is one of most frequent operations in network device configuration management.

```
<?xml version="1.0" encoding="utf-8"?>
<NetworkDeviceTemplate Version="2.0" TargetDeviceRole="Hostleaf">
  <TargetDevices>
    <Device>
      <Sku>CiscoNexus3064</Sku>
      <FirmwareVersion>1.0</FirmwareVersion>
    </Device>
    <Device>
      <Sku>CiscoNexus7000</Sku>
      <FirmwareVersion>1.0</FirmwareVersion>
    </Device>
  </TargetDevices>
  <ConfigSections>
    <ConfigSection>
      !
      ! ACL used for VTY access controls
      !
      ip access-list ssh-only{
        <Counter Initial="10" Increment="10"></Counter>
        $Counter.NextValue permit tcp 10.20.0.0/19 any eq 22
        <ForEach ElementName="$UtilityNodeRange"
EnumVariable="$NetworkDataCenterGlobalSettings.-
UtilityNodeRanges" >
          $Counter.NextValue permit tcp $UtilityNodeRange.IPCidrString
          any eq 22
        </ForEach>
        <ForEach ElementName="$WaNetMonServerIP"
EnumVariable="$NetworkDataCenterGlobalSettings.-
WaNetMonServerIPs" >
          $Counter.NextValue permit tcp
          $WaNetMonServerIP.IPCidrString any eq 22
        </ForEach>
        <ForEach ElementName="$FcIPRange"
EnumVariable="$NetworkHardware.FcIPRanges">
          $Counter.NextValue permit tcp $FcIPRange.IPCidrString
          any eq 22
        </ForEach>}
    </ConfigSection>
  </ConfigSections>
</NetworkDeviceTemplate>
```

Templates can be configured with different sections and section titles to facilitate arrangement of the network device configuration data within the template. By way of example sections can include TargetDevices, TemplateVersion, ConfigSection, and UpdateConfiguration.

With reference to TargetDevices section, there could be multiple network devices that can be used for a given targetDeviceRole. The TargetDevice section can be used can be used identify all the devices for which the template is applicable to and their specific roles. The TargetDevice section can include the information of the device such as HardwareSKU, Supported Firmware version, manufacturer etc, as shown below.

```
<TargetDevices>
  <Device>
    <Sku>CiscoNexus3064</Sku>
```

```
    <FirmwareVersion>1.0</FirmwareVersion>
  </Device>
  <Device>
    <Sku>CiscoNexus7000</Sku>
    <FirmwareVersion>1.0</FirmwareVersion>
  </Device>
</TargetDevices>
```

With reference to the TemplateVersion section, each template can have a version number, to track changes between templates and rollout the different configuration changes to the devices.

```
<NetworkDeviceTemplate Version="2.0" TargetDeviceRole="Hostleaf">
```

The specific TemplateVersion associated with a device may be stored in association with the device (e.g., in the device configuration), such that, automated tools can verify the version for validation and generate the different configuration to be applied to the device as needed. By way of example, a specific comment field can be incorporated into a device configuration file to store the Template version.

With reference to the ConfigSection, the template can include several different ConfigSections that specify several different aspects of a full configuration or one or more selected ConfigSections in cases of a partial configuration. Further, a user can specify absolute config as well as use pre-specified variables that will be replaced by actual values during config generation. It can also be specified whether a change in given section may require a reboot of the network device when the change is applied. By way of example below:

```
<ConfigSection RequiresReboot="true">
  !
  no ip domain-lookup
  ip domain-name ntwk.msn.net use-vrf management
  !
  tacacs-server key 0 $UnencryptedTacacsKey
  ip tacacs source-interface mgmt0
  tacacs-server host $FirstTacacsHost
  tacacs-server host $SecondTacacsHost
  tacacs-server host $ThirdTacacsHost
  !
  aaa group server tacacs+ tacacs
    server $FirstTacacsHost
    server $SecondTacacsHost
    server $ThirdTacacsHost
    use-vrf management
  !
  hostname $Hostname
  !
  no logging event link-status default
  no logging event trunk-status default
  !
  errdisable recovery interval 600
  errdisable recovery cause link-flap
</ConfigSection>
```

The template can further support a programmatic mechanism for defining a configuration template. For example, the template can be programmatically defined to loop for all values for a given type in the current scope. Similarly, conditionals using the if else construct can be used to define the configuration template. By way of example below:

```
<ForEach ElementName="$VlanInterface" EnumVariable=
"$NetworkHardware.VlanInterfaces">
    <If DataSource="$VlanInterface.IPv6Enabled"
ComparisonOperator="Equal" CompareWith="True">
        network $VlanInterface.IPv6Address.IPCidrString
    </If>
</ForEach>
```

With reference to UpdateConfiguration section, the UpdateConfiguration section can used to generate templates for devices that do not support taking full configuration and reconciling the full configuration with the device.

With continued reference to FIG. 2, the network graph component 270 is responsible for managing network data in a graphical representation, in accordance with embodiments described herein. A network graph refers to a graphical representation of network infrastructure components. Network devices can be represented in the network graph (G(V, E)) as either node (V) or link (E). The concept of subgraph (G') can be used to describe a subset of nodes and links in the graph that are logically related. The static graph information are scattered in different databases which essentially form the data provider or the data source to generate an instance of configuration from a given device template. The graph contains both physical and logical related configuration information including Border Gateway Protocol (BGP) configurations.

In operation, a memory graph G(V,E) representation of network elements for a whole datacenter, can be built with minimal information. The details of the network graph can be lazily populated on an as needed basis depending upon the target device and later cached. This would allow some space for future growth before handling a distributed graph representation. The configuration database has logical information such as the load balancer yips (virtual IPs), the environment and machine function information and server pool definitions. The network service database can also have global settings that may be applicable to configuration across all devices in a given datacenter.

To generate entire device configuration via an automated execution, several different types network configurations can be identified. By way of example, connectivity information for network devices (tor/spine/border-leaf), IP address assignments for the clusters/devices, and device configuration templates for each type of device and cluster. In addition, the connectivity information for existing devices can be managed in the network graph. In this regard, the network graph and corresponding information may also be authoritative connectivity information that can be used in monitoring to detect any drift in actual connectivity from information identified via a LLDP (Link Layer Discovery Protocol). It is contemplated that monitoring to detect drift is based on comparing connectivity information on the graphical representation to connectivity information identified using a link layer discovery protocol. The link layer discovery protocol refers to an internet protocol suite used by network device for advertising identity, capabilities, and neighbors on an IEEE 802 local area network.

Additionally IP address assignments may be tracked in the configuration database 250. As IP address assignments grow for a datacenter, smaller subnets may be carved from the IP address assignments as needed. The configuration database 250 may be used to store the generated configuration files. This helps to preserve historical data that support a roll back mechanism to different configuration snapshots. The operation configuration database is used to store any kind of generated configuration for devices in the datacenter. This includes both full configuration and partial configuration. As such, with exemplary embodiments described above, reliability of network devices and specifically network device configuration can be achieved for supporting computing infrastructures and in particular, the applications and services supported by a cloud computing system.

Accordingly, in a first embodiment described here, a system for dynamic network device configuration in a distributed network infrastructure is provided. The system includes a classification component configured for: identifying network device configuration data corresponding to a network infrastructure; and determining classification units for the network device configuration data. The network device configuration data are classified in classification units selected from one of: a network topology, an operating configuration, and a network service.

The system further includes a configuration generator component configured for: accessing a network device configuration template. The network device configuration template corresponds to network device configuration data based on template elements. The configuration generator component is further configured for: referencing network device configuration data classified in classification units in a dataset storage; merging the network device configuration data with the network device configuration template, where the network device configuration template programmatically defines configuration of network devices in the network infrastructure; generating a network device configuration instance based on the network device configuration template comprising merged network device configuration data; and communicating the network device configuration instance using an interface, wherein the interface is employed to configure corresponding network devices based on the network device configuration instance.

In a second embodiment described herein, one or more computer-storage media storing computer-useable instructions that, when used by one or more computing devices, cause the one or more computing devices to perform a method for dynamic network device configuration is provided. The method includes accessing a network device configuration template, where the network device configuration template corresponds to network device configuration data based template elements. The method further includes referencing network device configuration data classified in classification units in a dataset storage component. The method also includes merging the network device configuration data with the network device configuration template, wherein the network device configuration template programmatically defines configuration of network devices in the network infrastructure. The method further includes generating a network device configuration instance based on the network device configuration template comprising merged network device configuration data. The method includes communicating the network device configuration instance using an interface, wherein the interface is employed to configure corresponding network devices based on the network device configuration instance.

In a third embodiment described herein, a computer-implemented method for dynamic network device configuration is provided. The method includes retrieving a network device configuration template, where the network device configuration template corresponds to network device configuration data based template elements. The method also includes identifying one or more template elements in the network device configuration template, where the template elements include variable placeholders, firmware, stocking keeping unit, and target devices. The method includes referencing, from a dataset storage component, dynamic values for one or more template elements, where the dynamic values are updated with classified configuration data associated with the network device in the classification units.

The method includes generating a network device configuration instance using the network device configuration template and dynamic values of classified network device configuration data, where generating the networking configuration instance comprises: retrieving the dynamic values for the one or more template elements; evaluating the one or more template elements with dynamic values from the dataset storage; and replacing the one or more template elements with dynamic values from the dataset storage. The method includes communicating the network device configuration instance using an interface, wherein the interface is employed to configure corresponding network devices based on the network device configuration instance.

Figure 3:
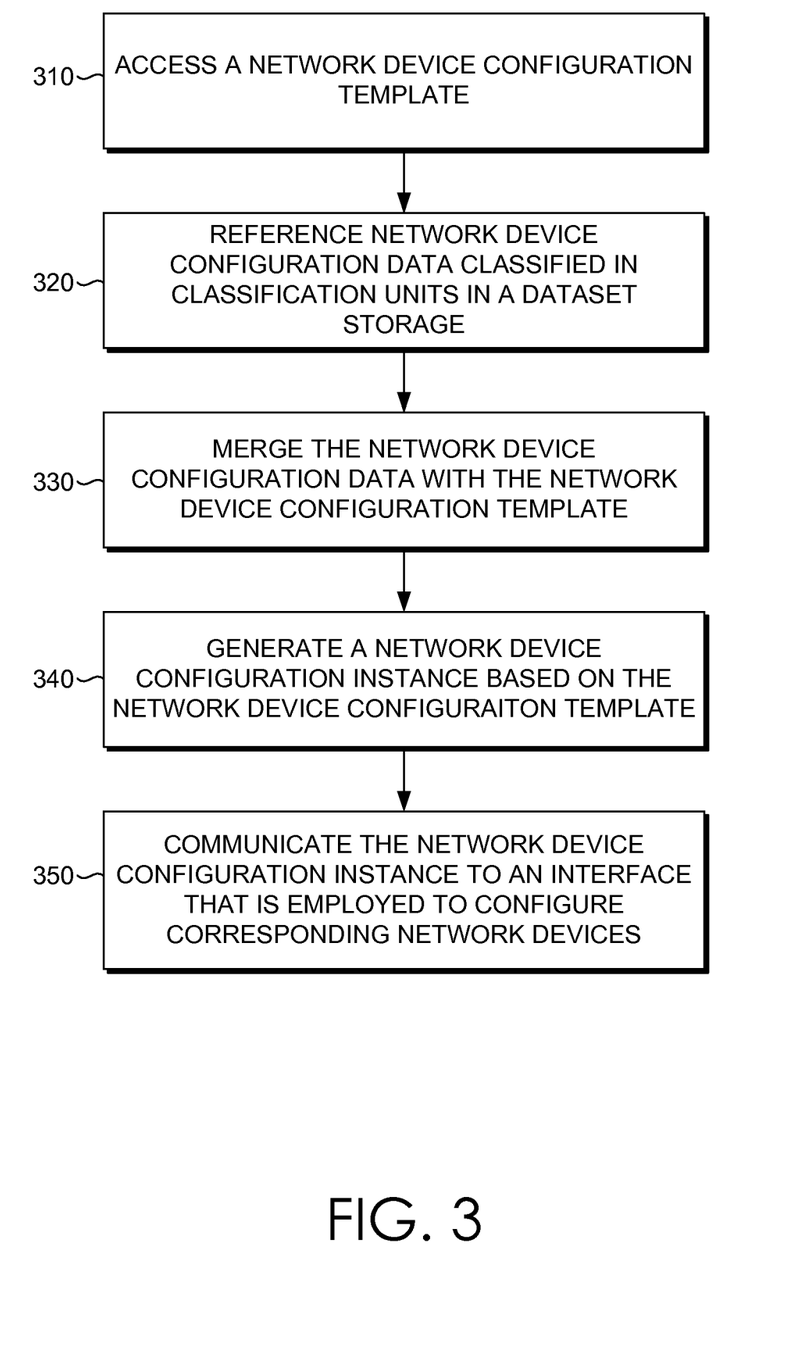
FIG. 3 is a flow diagram showing a method for dynamic network device configuration, in accordance with embodiments described herein.

Turning now to FIG. 3, a flow diagram is provided that illustrates a method 300 for dynamic network device configuration. Initially at block 310 a network device configuration template is received. The network device configuration template corresponds to network device configuration data based on template elements. The template elements correspond to template sections selected from one or more of a target device section, a template version section, a configuration section, and an update configuration section. The template sections comprise at least one of variable placeholder, SKU and firmware template elements for merging network device configuration data in a customized format and structure based on a network object model. The network object model corresponds to template elements in the configuration, where the network object model identifies network devices having configuration parameters and configuration text.

At block 320, the network device configuration data classified in classification units in a dataset storage component is referenced. The network device configuration data comprises values associated with network devices in a network infrastructure, where the values of the network devices are stored, processed, and programmed data that change over time. At block 330, the network device configuration data is merged with the network device configuration template. The network device configuration template programmatically defines configuration of network devices in the network infrastructure. At block 340, a network device configuration instance is generated based on the network device configuration template comprising merged network device configuration data. At block 350, the network device configuration instance is communicated using an interface, where the interface is employed to configure corresponding network devices based on the network device configuration instance.

Figure 4:
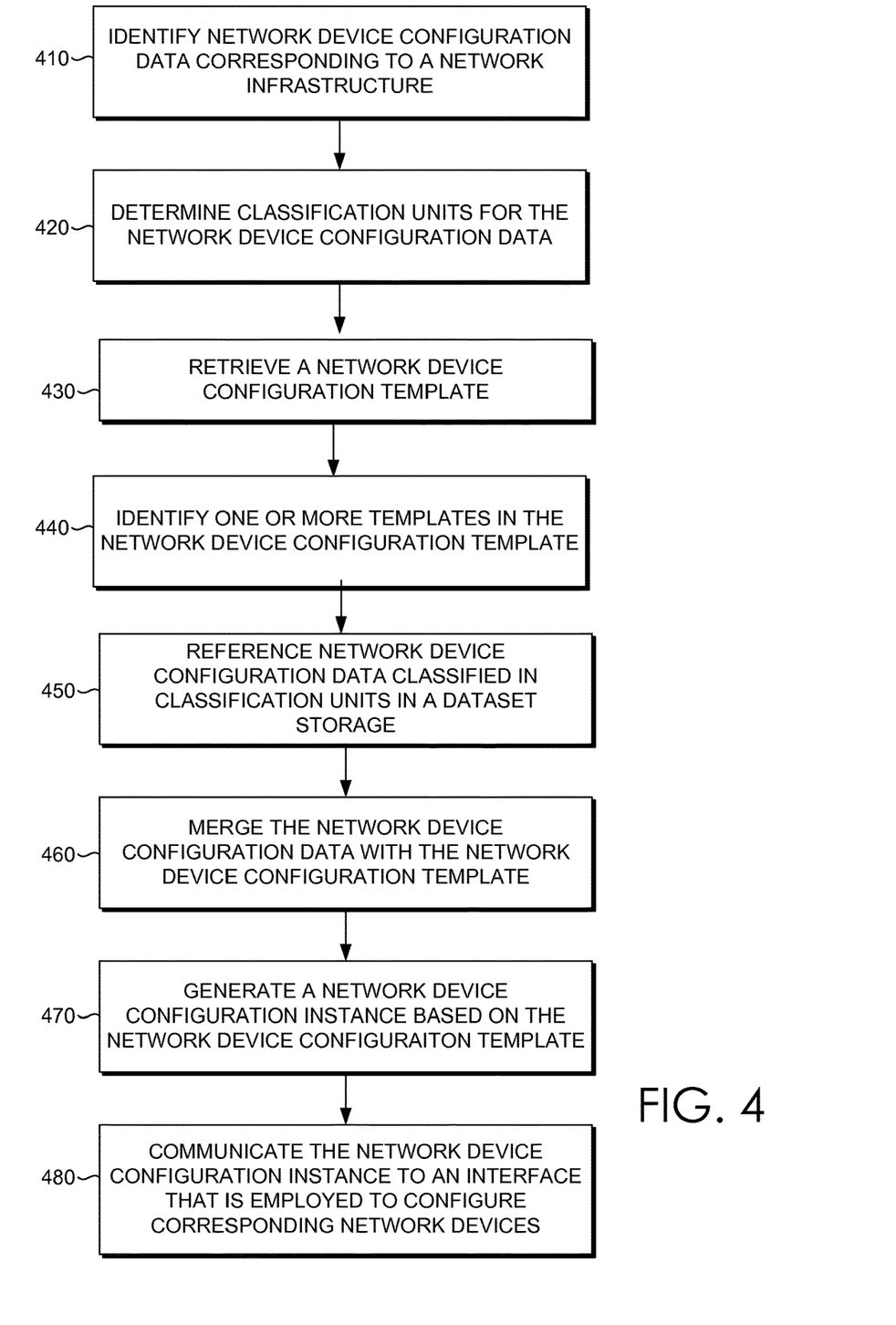
FIG. 4 is a flow diagram showing a method for dynamic network device configuration, in accordance with embodiments described herein.

Turning now to FIG. 4, a flow diagram is provided that illustrates a method 400 for dynamic network device configuration. Initially at block 410, network device configuration data corresponding to a network infrastructure is identified. At block 420, classification units for the network device configuration data are determined, where the network device configuration data are classified in classification units selected from one of: a network topology, an operating configuration, and a network service. It is contemplated that the method can include identifying attributes of network device configuration data, where attributes indicate a retrieval processing mechanism that determine classifying the network device configuration data within a selected classification unit. Classifying the network device configuration data is based on a retrieval processing mechanism, where the retrieval processing mechanism comprises at least one of deriving the network device configuration data, transforming the network device configuration data, and correlating the network device configuration data.

At block 430, a network device configuration template is retrieved, where the network device configuration template corresponds to network device configuration data based template elements. At block 440, one or more template elements are identified in the network device configuration template, where the template elements include variable placeholders, firmware, stocking keeping unit, and a target device. At block 450, dynamic values for one or more template elements are referenced from a dataset storage component, where the dynamic values are updated with classified configuration data associated with network devices in the classification units. At block 460, the network device configuration data is merged with the network device configuration template. The network device configuration template programmatically defines configuration of network devices in the network infrastructure.

At block 470, a network device configuration instance using the network device configuration template and dynamic values of classified network device configuration data is generated, where generating the networking configuration instance comprises: retrieving the dynamic values for the one or more template elements; evaluating the one or more template elements with dynamic values from the dataset storage; and replacing the one or more template elements with dynamic values from the network device configuration dataset storage. At block 480 the network device configuration instance is communicated to configure a network device associated with the network device configuration instance.

Figure 5:
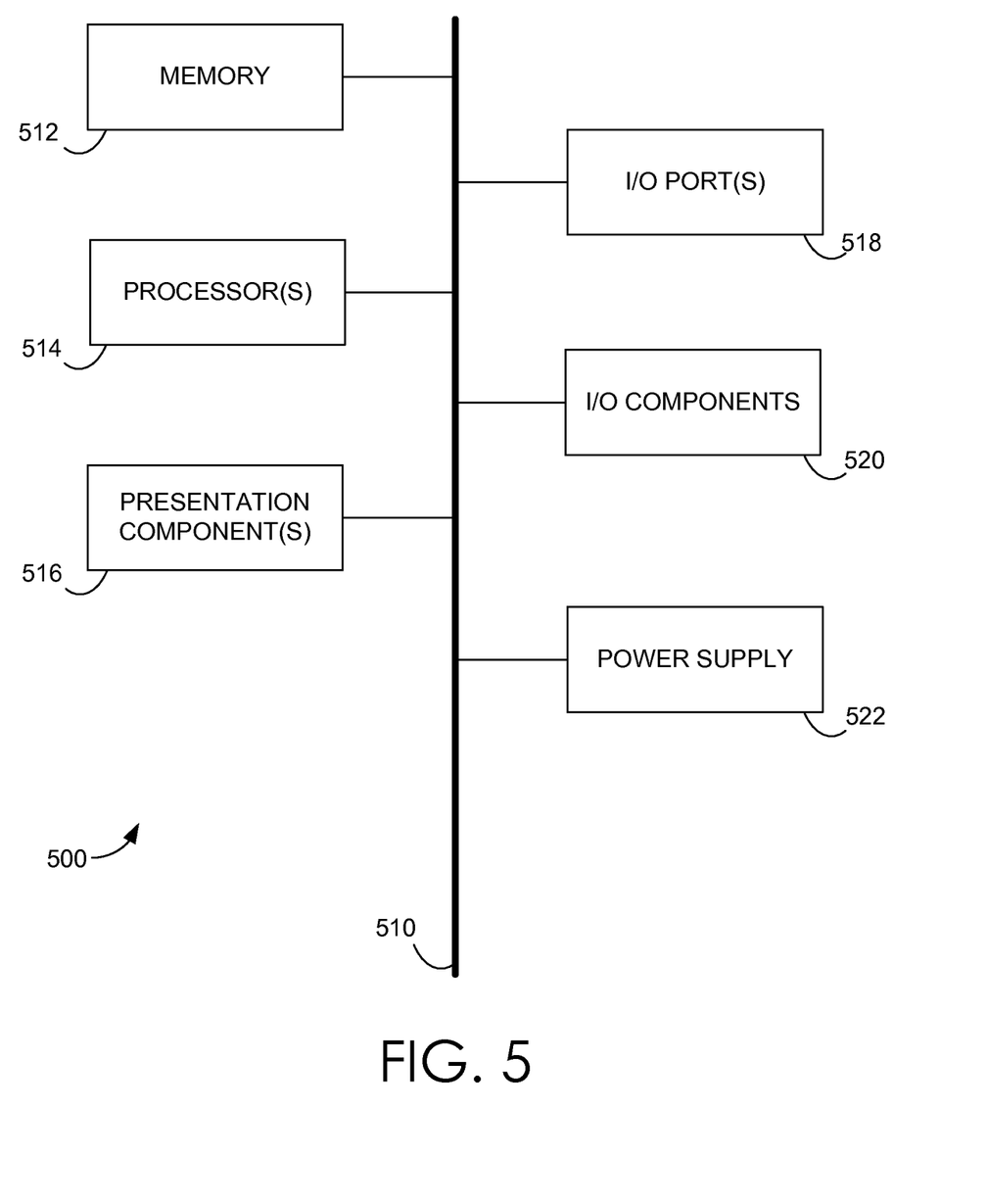
FIG. 5 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for dynamic network device configuration in distributed network infrastructures, the system comprising:
    one or more hardware processors and memory storing computer-executable instructions and components embodied thereon that, when executed, by the one or more hardware processors, causes the one or more hardware processors to perform operations comprising:
    identifying network device configuration data corresponding to a network infrastructure; and
    determining classification units for the network device configuration data, wherein the network device configuration data is stored based on a corresponding classification unit in one of the following: a network topology database, an operating configuration database, and a network service database;
    accessing a network device configuration template, wherein the network device configuration template corresponds to network device configuration data based on template elements;
    referencing network device configuration data classified in classification units in a dataset storage;
    merging the network device configuration data with the network device configuration template, wherein the network device configuration template programmatically defines configuration of network devices in the network infrastructure;
    generating a network device configuration instance based in part on the network device configuration template comprising merged network device configuration data; and
    communicating the network device configuration instance using an interface, wherein the interface is employed to configure corresponding network devices based on the network device configuration instance.

2. The system of claim 1, the operations further comprising:
    identifying attributes of network device configuration data, wherein attributes indicate a retrieval processing mechanism that determine classifying the network device configuration data within a selected classification unit.

3. The system of claim 2, the operations further comprising:
    classifying the network device configuration data in classification units, wherein classifying the network device configuration data is based on the retrieval processing mechanism, wherein the retrieval processing mechanism comprises at least one of: deriving the network device configuration data, transforming the network device configuration data, and correlating the network device configuration data.

4. The system of claim 1, wherein merging network device configuration data with the network device configuration templates further comprises:
- identifying a template element in a network device configuration template;
- querying the dataset storage for network device configuration data; and
- programmatically defining template elements using the network device configuration data.

5. The system of claim 4, wherein programmatically defining template elements comprises:
- evaluating at least one variable placeholder with corresponding a value in the dataset storage; and
- replacing the at least one variable placeholder with the value from the dataset storage.

6. The system of claim 1, further comprising a configuration scope component for:
- processing the network device configuration instance based on a configuration scope of the network device configuration template, wherein the network device configuration template corresponds to the configuration scope that indicates an extent of configuration of configuration units of network devices.

7. The system of claim 1, further comprising a network graph component configured for:
- generating a graphical representation of a logical and physical relationship between nodes and links in a network topology of the network infrastructure, wherein the graphical representation provides connectivity information for facilitating generation of the network device configuration instance.

8. The system of claim 7, wherein the graphical representation facilitates monitoring to detect drift in the connectivity information, wherein drift is determined based on comparing connectivity information on the graphical representation to connectivity information identified using a link layer discovery protocol.

9. The system of claim 1, further comprising a configuration database component configured for:
- storing the network device configuration instance in a network device configuration instance store; and
- transmitting the network device configuration instance based on an Application Programming Interface (API) to configure network devices in the network infrastructure based on the network device configuration instance.

10. One or more computer-storage media storing computer-useable instructions that, when used by one or more computing devices, cause the one or more computing devices to perform a method for dynamic network device configuration, the method comprising:
- accessing a network device configuration template, wherein the network device configuration template corresponds to network device configuration data based template elements;
- referencing network device configuration data classified in classification units in a dataset storage, the network configuration data is stored based on a corresponding classification unit in one of the following: a network topology database, an operating configuration database, and a network service database, associated with the dataset storage;
- merging the network device configuration data with the network device configuration template, wherein the network device configuration template programmatically defines configuration of network devices in a network infrastructure;
- generating a network device configuration instance based on the network device configuration template comprising merged network device configuration data; and
- communicating the network device configuration instance using an interface, wherein the interface is employed to configure corresponding network devices based on the network device configuration instance.

11. The media of claim 10, wherein the network device configuration data comprises values associated with network devices in the network infrastructure, wherein the values of the network devices are stored, processed, and programmed data that change over time.

12. The media of claim 10, wherein the network device configuration data comprises functional attributes that indicate how network devices operate.

13. The media of claim 10, wherein the template elements are based on a template language with a common semantic to programmatically configure network devices, wherein the template language defines commands that indicate configuration operations to be performed on the network devices during configuration.

14. The media of claim 10, wherein the template elements correspond to template sections selected from one or more of a target device section, a template version section, a configuration section, and an update configuration section.

15. The media of claim 14, wherein the template sections comprise at least one of variable placeholder, SKU and firmware template elements for merging network device configuration data in a customized format and structure based on a network object model.

16. The media of claim 15, wherein network object model corresponds to template elements in the configuration, wherein the network object model identifies network devices having configuration parameters and configuration text.

17. The media of claim 10, wherein merging the classified network device configuration data with the network device configuration templates further comprises:
- identifying a template element in a network device configuration template;
- querying the dataset storage for network device configuration data; and
- programmatically defining template elements using the network device configuration data based on a reflection mechanism that comprises type introspection.

18. A computer-implemented method for dynamic network device configuration, the method comprising:
- retrieving a network device configuration template, wherein the network device configuration template corresponds to network device configuration data based template elements;
- identifying one or more template elements in the network device configuration template, wherein the template elements includes variable placeholders, firmware, stocking keeping unit, and a network device target device;
- referencing, from a dataset storage, dynamic values for one or more template elements, wherein the dynamic values are updated with classified configuration data associated with the network device in the classification units;
- merging the network device configuration data with the network device configuration template, wherein the network device configuration template programmatically defines configuration of network devices in a network infrastructure;
- generating a network device configuration instance using the network device configuration template and dynamic values of classified network device configuration data, wherein generating the networking configuration instance comprises:

accessing the dynamic values for the one or more template elements;

evaluating the one or more template elements with dynamic values from the dataset storage; and replacing the one or more template elements with dynamic values from the network device configuration dataset storage; and communicating the network device configuration instance using an interface, wherein the interface is employed to configure corresponding network devices based on the network device configuration instance.

19. The method of claim 18, wherein dynamic values into classification units based on:

identifying network device configuration data corresponding to the network infrastructure; and determining classification units for the network device configuration data, wherein the network device configuration data are classified in classification units selected from one of: a network topology, an operating configuration, and a network service.

20. The method of claim 18, wherein the network device configuration instance corresponds to a network device configuration scope, wherein the network device configuration scope indicates an extent of configuration for an intended network device configuration state for a selected network device, the network device configuration scope comprising a full configuration or a partial configuration, wherein a full configuration comprises configuring the an entirety of the selected network device, and the partial configuration comprises configuring an identified features of the selected network device.

* * * * *